United States Patent [19]
Williams

[11] Patent Number: 5,327,262
[45] Date of Patent: Jul. 5, 1994

[54] AUTOMATIC IMAGE SEGMENTATION WITH SMOOTHING

[75] Inventor: Leon C. Williams, Walworth, N.Y.

[73] Assignee: Xerox Corporation, Stamford, Conn.

[21] Appl. No.: 76,651

[22] Filed: May 24, 1993

[51] Int. Cl.$^5$ .................................................. H04N 1/40
[52] U.S. Cl. ...................................... 358/462; 358/530
[58] Field of Search ............... 358/530, 462, 464, 538, 358/467; 382/51, 9, 50

[56] References Cited

U.S. PATENT DOCUMENTS

| | | | |
|---|---|---|---|
| 3,294,896 | 12/1966 | Young, Jr. ................. | 178/5 |
| 4,194,221 | 3/1980 | Stoffel ...................... | 358/283 |
| 4,251,837 | 2/1981 | Janeway, III ............. | 358/283 |
| 4,509,195 | 4/1985 | Nadler ...................... | 382/51 |
| 4,547,811 | 10/1985 | Ochi et al. ................ | 358/283 |
| 4,556,918 | 12/1985 | Yamazaki et al. ......... | 358/283 |
| 4,559,563 | 12/1985 | Joiner, Jr. ................. | 358/283 |
| 4,578,714 | 3/1986 | Sugiura et al. ............ | 358/283 |
| 4,730,221 | 3/1988 | Roetling ................... | 358/283 |
| 4,736,253 | 4/1988 | Shida ....................... | 358/283 |
| 4,811,115 | 3/1989 | Lin et al. .................. | 358/283 |
| 5,014,124 | 5/1991 | Fujisawa .................. | 358/530 |
| 5,073,953 | 12/1991 | Westdijk .................. | 358/462 |
| 5,075,788 | 12/1991 | Funada ..................... | 358/462 |
| 5,101,438 | 3/1992 | Kanda et al. .............. | 358/462 |
| 5,175,635 | 12/1992 | Yamada et al. ........... | 358/462 |
| 5,202,933 | 4/1993 | Bloomberg ............... | 382/9 |

FOREIGN PATENT DOCUMENTS

| | | |
|---|---|---|
| 0521662 | 1/1993 | European Pat. Off. . |
| 2153619 | 8/1985 | United Kingdom . |

Primary Examiner—Stephen Brinich
Attorney, Agent, or Firm—Mark Costello

[57] ABSTRACT

In conjunction with an image segmentation arrangement, in which the image is processed with an image type detection arrangement, the output of which controls an image processing of the image, there is provided a morphological filtering operation, which initially provides a noise removal filter operating on the image detection signal, to remove noise within an area of the image detection signal, and subsequently provides hole filling filter, which bridges small gaps in the image type detection results.

20 Claims, 3 Drawing Sheets

AUTOMATIC IMAGE SEGMENTATION WITH SMOOTHING

The present invention relates generally to a system for processing document images to identify image types therein, and more particularly to a method for determining the appropriate image type segmentation requirements for a document image at a given location on the document.

CROSS REFERENCE

Cross reference is made to U.S. patent application Ser. No. 08/004,479 by Shiau (published at EP-A2 0 521 662 on Jan. 7, 1993).

INCORPORATION BY REFERENCE

U.S. Pat. No. 4,194,221 to Stoffel, U.S. Pat. No. 4,811,115 to Lin et al. and U.S. patent Ser. No. 08/004,479 by Shiau (published at EP-A2 0 521 662 on Jan. 7, 1993) are herein specifically incorporated by reference for their teachings regarding image segmentation.

BACKGROUND OF THE INVENTION

In the reproduction of copies of an original document from video image data created, for example, by electronic raster input scanning from an original document, one is faced with the limited resolution capabilities of the reproducing system and the fact that output devices are mostly binary or require compression to binary for storage efficiency. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of multiple image types, including high frequency halftones, low frequency halftones, continuous tones, line copy, error diffused images, etc. or a combination, in some unknown degree, of some or all of the above or additional image types. In the face of these possibilities, optimizing the image processing system for one image type in an effort to offset the limitations in the resolution capability of the reproducing apparatus used, may not be possible, requiring a compromise choice which may not produce acceptable results. Thus, for example, where one optimizes the system for low frequency halftones, it is often at the expense of degraded reproduction of high frequency halftones, or of line copy, and vice versa.

Automatic segmentation serves as a tool to identify image types, and identify the correct processing of such image types.

In U.S. Pat. No. 4,194,221 to Stoffel, the problem of image segmentation was addressed by applying a function instructing the image processing system as to the type of image data present and particularly, an auto correlation function to the stream of pixel data, to determine the existence of halftone image data. Such a function is expressed as:

$$A(n) = \sum_{t=0}^{t=\text{Last}} [p(t) \times p(t+n)] \quad (1)$$

where
n = the bit or pixel number;
p = the pixel voltage value; and
t = the pixel position in the data stream.

Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal. In U.S. Pat. No. 4,811,115 to Lin et al, the auto correlation function is calculated for the stream of halftone image data at selected time delays which are predicted to be indicative of the image frequency characteristics, without prior thresholding. The arithmetic function used in that auto correlation system is an approximation of the auto correlation function using logical functions and addition, rather than the multiplication function used in U.S. Pat. No. 4,194,221 to Stoffel. Valleys in the resulting auto correlated function are detected to determine whether high frequency halftone image data is present.

U.S. patent Ser. No. 08/004,479 by Shiau is directed to the particular problem noted in the use of the auto correlation function of the false characterization of a portion of the image as a halftone, when in fact it would be preferable for the image to be processed as a line image. Examples of this defect are noted particularly in the processing of Japanese Kanji characters and small Roman letters. In these examples, the auto correlation function may detect the image as halftones and process accordingly, instead of applying a common threshold through the character image. The described computations of auto correlation are one dimensional in nature, and this problem of false detection will occur whenever a fine pattern that is periodic in the scan line or fast scan direction is detected. In the same vein, shadow areas and highlight areas are often not detected as halftones, and are then processed with the application of a uniform threshold.

GB 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Of background interest in this area are U.S. Pat. No. 4,556,918 to Yamazaki et al. showing an arrangement assuming a periodicity of an area of halftone dots which are thresholded against an average value derived from the area to produce a density related video signal; U.S. Pat. No. 4,251,837 to Janeway, III which shows the use of a three decision mode selection for determining threshold selection based on gradient constants for each pixel; U.S. Pat. No. 4,578,714 to Sugiura et al. which shows random data added to the output signal to eliminate pseudo-outlines; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system.

U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. teaches a method of processing gray level values, depending on the density level of blocks of pixels, and their difference from a minimum or maximum value. The blocks are then processable by a halftone processing matrix depending on the difference value, U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

Unfortunately, while significant work has been done in the automatic image segmentation area, with efforts, particularly characterized by U.S. patent Ser. No. 08/004,479 by Shiau, to reduce the incorrect characterization of one image type as another, the problem continues to present difficulty. While image types can be characterized with a fair degree of particularity, the image content also has a tendency to impact the image. For example even using the improved methods of Shiau, some Kanji characters continue to be identified as halftones. Image quality issues are presented when the determination seemingly dithers between two image types. While this occasionally may be an accurate representation of the document intent, more commonly, it does not. Such artifacts present significant problems for the ultimate user of the document.

U.S. Pat. No. 5,202,933 to Bloomberg teaches a method and apparatus for differentiating and extracting text and line graphics in an image with the use of morphological operations of Open and Close.

The patents cited herein are incorporated by reference for their teachings.

SUMMARY OF THE INVENTION

In accordance with the invention there is provided a method and apparatus for segmenting an image, to smooth the determination of image type across the document image.

In accordance with one aspect of the invention, in conjunction with an image segmentation arrangement, in which the image is processed with an image type detection arrangement, the output of which controls an image processing of the image, there is additionally provided a morphological filtering operation, which initially provides a noise removal filter operating on the image classification signal, to remove noise within an area of the image classification signal, and subsequently provides hole filling filter, which bridges small gaps in the image classification results.

After consideration of document images as such, it has been noted that image classification could be considered a binary process similar to a color separation, i.e., detection is either ON or OFF. Using that model, for a single image type, classification defects can be characterized as either noise, defined as occasional image type detection in areas of predominantly non detection, or holes, defined as occasional non detection in areas of predominantly detection. Morphological filtering methods and apparatus, as described for example in U.S. Pat. No. 5,202,933 to Bloomberg, can be used to coalesce areas which are primarily one state or the other. Thus, detection and non-detection areas will remain contiguous areas, uncluttered by occasional false detections. Other objects and advantages will become apparent from the following description taken together with the drawings in which:

Figure 4A:
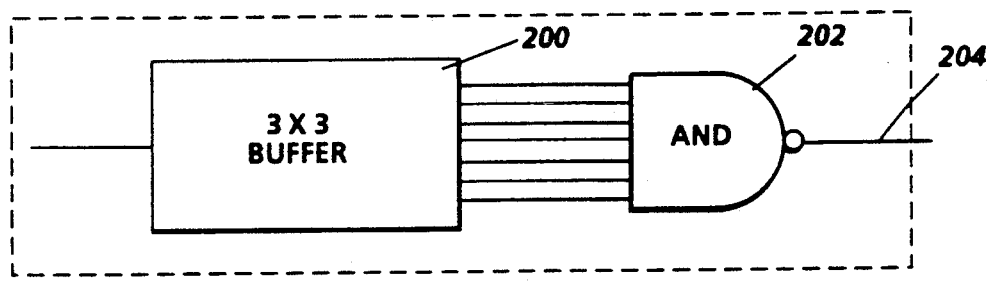
Figure 4B:
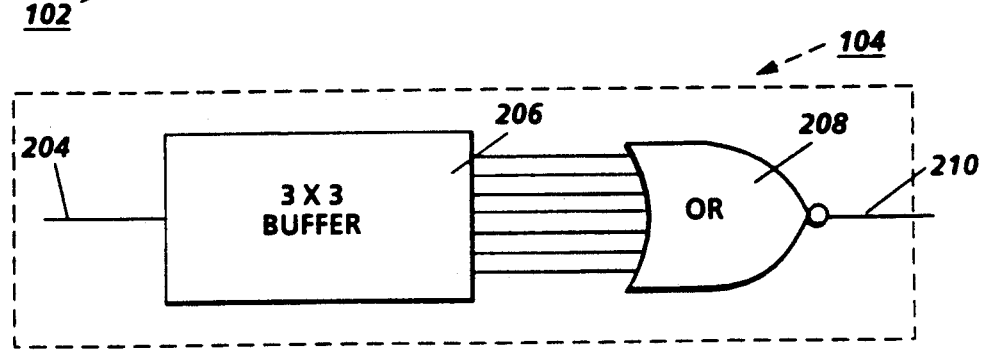

FIG. 4A and 4B provide functional descriptions of the Open filter and Close filter.

Image data in the form of video image signals, (hereinafter, pixels), which may be either analog or digital voltage representations of the image, is provided from a suitable source. For example, the image data pixels may be obtained through line by line scanning of an image bearing original by one or more photosensitive elements, such as a multiple photosite array of charge coupled devices, commonly referred to as CCD's. Line by line scanning of an image bearing original for the derivation of image data is well known and does not form a part of the present invention. Image data may also be derived by a computer or workstation programmed in accordance with document creation application software, or from a data storage device.

In content, the original may be composed entirely of lines, low frequency halftone image(s), high frequency halftone image(s), continuous tone image(s), or combinations thereof, where each of these components is an "image type". Preferably, each image type is processed in a distinct manner. Where the original consists of lines, as for example a typed page, the image pixels may be converted to either one or two signal levels, one representing non-image or background areas and the other image areas. This is commonly accomplished with a fixed level thresholding process.

A continuous tone image comprises an unscreened image, typically a photograph. When scanned, the voltage signal of the pixels produced are representative of the gray levels making up the picture. This is commonly accomplished with a varying level thresholding process, referred to as dithering, screening or halftoning.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cycles per inch or more, while a low frequency screen is defined as one having a frequency less than 100 cycles per inch. Halftone images, therefore, comprise a pattern of discrete dots, the frequency of which depends upon the screening frequency used. High frequency halftones are descreened and rescreened with a screen appropriate for the printer. Low frequency halftones require a much larger filter to descreen. This image type is best reproduced with error diffusion.

With reference now to the drawings where the showings are for the purpose of illustrating a preferred embodiment of the invention and not for limiting same, in an application incorporating the present invention, such as that described, for example, in U.S. Pat. No. 4,194,221 to Stoffel, FIG. 1 demonstrates handling of image data, which may be derived from any number of sources, including a raster input scanner, a graphics workstation, an electronic memory or other storage element, etc. The stream of image pixels from an image data input is fed to a data buffer 20. Buffer 20, which comprises any suitable commercially available serial in/serial out multi-row buffer having a bit storage capacity sufficient to temporarily store lines of image pixels, permits processing of image data in blocks of several lines.

Image data is made available to the image processing system along data bus 22. Image data at this point is in its raw gray format, for example, 6–8 bits per pixel. To detect the presence of high frequency halftone image data, a one dimensional block of image pixels is unloaded from buffer 20 onto a data bus 22. The block of image pixels is passed to halftone detector or auto correlator 24 which, auto correlates each pixel group in accordance with a predetermined algorithm to determine if the image data contains halftones or not. An output on line 26 indicates whether high or low frequency halftone image data has been detected. A suitable block size is 16 pixels at a time at 400 spots/inch, or 12 pixels at a time at 300 spots/inch. Too large a sample size has a tendency to cause a blurred result, while too small a sample size does not contain a large enough amount of data for a good sample of the function. Either case results in inaccuracies in detecting halftone image data.

The presence of line copy and/or continuous tone data is determined by discriminator 34. Discriminator 34 functions to produce an output on line 35 indicative of the presence of line copy or continuous tone image data. Specific arrangements accomplishing halftone detection and line copy/continuous tone discrimination are described in U.S. patent application Ser. No. 08/004,479 by Shiau (published at EP-A2 0 521 662 on Jan. 7, 1993).

Figure 1:
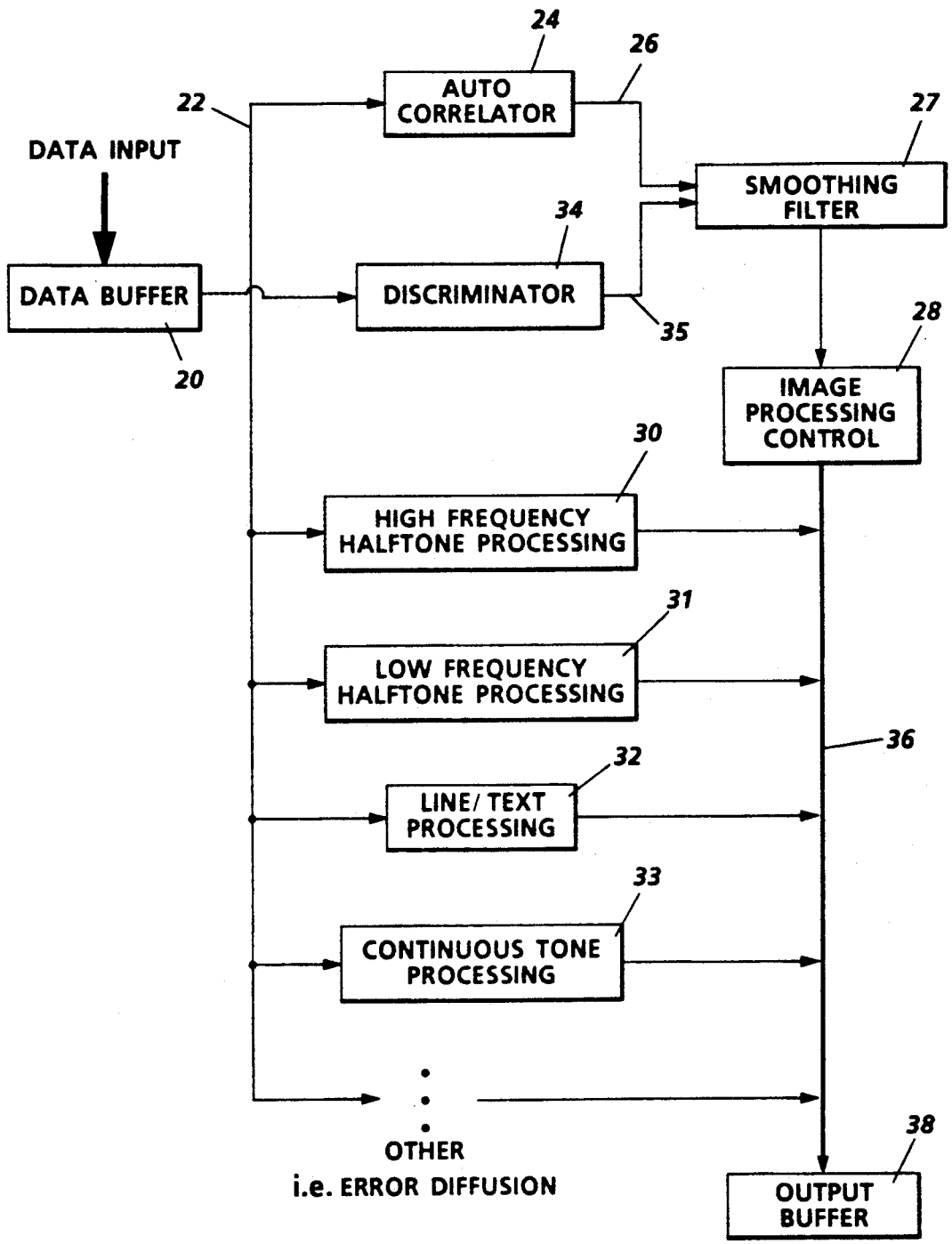
FIG. 1 illustrates a document image processing system wherein the present invention finds particular use.
Figure 2:
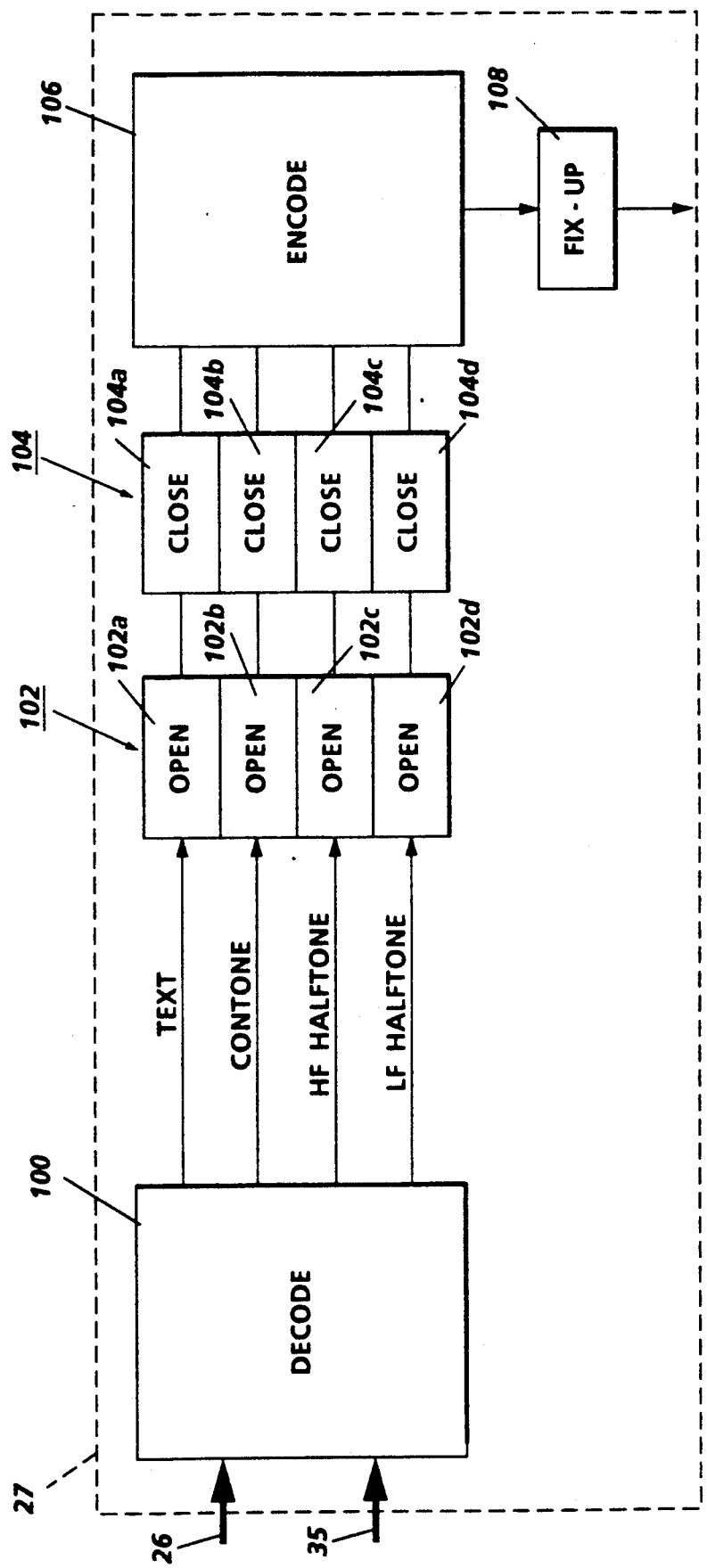
FIG. 2 shows a detail of the filter components of FIG. 1.

In accordance with the invention and with reference to FIGS. 1 and 2, the data on lines 26 and 34 is directed to the input of the smoothing filter circuit, which will operate on the detection signals in the manner described hereinbelow. With respect to FIG. 2, the classification or image type detection signals are initially directed to decoder 100, which separates the image type detection signals on lines 26 and 36 into what amounts to four image type "separations", each image type separation indicating with a binary or ON/OFF signal the presence or absence of a particular image type at each pixel location within the document image. Each of the image type separation signals will be processed independently of the other image type separation signals. Each image type separation signal is initially directed to a specific Open filter 102a, 102b, 102c or 102d, and the output of each Open filter is subsequently directed to a corresponding Close filter 104a, 104b 104c or 104d. The outputs of each Close filter, the processed image type separation signals, are combined into a signal representing the 0 possible processing choices at encoder 106, which typically might combine the four signals into a single multi-bit selection signal representing the possible image types. A fix up circuit 108 which could potentially be a look up table, programmed with options determined by historical results or user preference is provided to correct the processing selection signal in the event of an illegal image type signal (two types are selected, or none is selected). The result output to image processing control 28, better shown in FIG. 1.

Figure 3A:
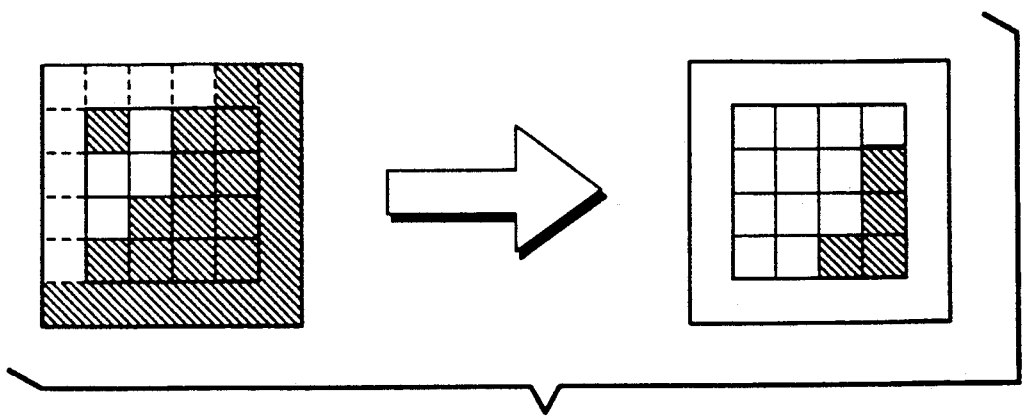
FIG. 3A and 3B show the function of the Open filter and Close filters.

FIGS. 3 and 4 provide an illustrative example of the operation of Open filter 104 and Close filter 106. With reference to FIG. 4A, each Open filter functionally includes a buffer memory 200 suitable for storing the binary detection signals for a predetermined neighborhood of detection signals (where the detection signals can be mapped to the location or pixel in the image for which the signal controls processing. Note however, the detection signal is an instruction about processing, and not the image data), shown in the illustration as an example 3×3 area surrounding the signal in consideration. Each storage location is connected to an AND gate 202, and is processed with a logical AND function that produces an ON signal whenever all the detection signals in the neighborhood are turned ON. Turning to FIG. 3A, it can be seen that the Open filter erodes edges in the detection response, and deletes noise (such as the single detections signals standing alone).

Figure 3B:
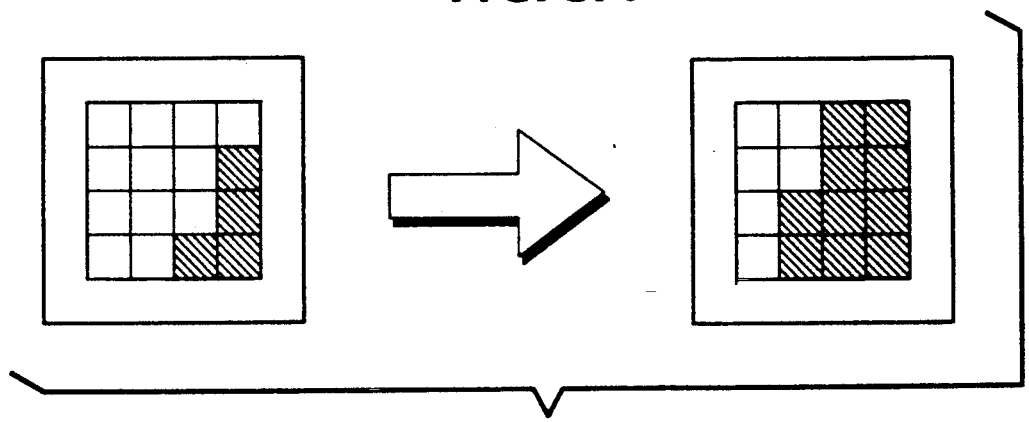

With reference to FIG. 4B, each Close filter functionally includes a buffer memory 206 suitable for storing the eroded binary detection signals on line 204 for a predetermined neighborhood of detection signals, shown in the illustration as a 3×3 area surrounding the pixel in consideration. Each storage location is connected to an OR gate 208, and is processed with a logical OR function that produces an ON signal whenever any of the pixels in the neighborhood are turned ON. Turning to FIG. 3B, it can be seen that the Close filter dilates edges in the signal, smooths jaggies, and would (although not specifically illustrated here) bridge small gaps in ON signals. Open and Close filter functions are fully described in U.S. Pat. No. 5,202,933 to Bloomberg, incorporated by reference.

It will no doubt be appreciated that different smoothing effects will be achieved with different neighborhoods which may be larger or smaller, or in some other manner define a different neighborhood of pixels. The desired size and shape of the neighborhood may be related to image type and may be programmable. Additionally, while the logic response described applies when all the signals in a given area have a predetermined state, the principle of the invention applies as well where a predetermined number of signals in the group of signals have the specific state.

It may be expected that as a result of the filtering functions applied, that a reconciliation process will be required downstream from the encoder. Thus, fix up circuit 108 checks the validity of the processed detection signal, and, if invalid, in one possible embodiment, repeats the last valid signal.

Image processing control 28 serves essentially as a switch to allow data from the image processing sections, including high frequency halftone processing section 30, low frequency halftone processing 31 and line image processing section 32 and continuous tone processing section 34, to flow through bus 36 to an output buffer 38 in accordance with the detection of data in the particular mode. Image processing control 28 controls data bus 36 to allow data flow from each processing section, in accordance with the signals passed thereto from halftone detector 24 or discriminator 34. Each processing section processes all image data in accordance with its function, but only that data appropriately processed is allowed to pass to the output buffer 38. Data improperly processed is discarded.

The invention has been described with reference to a preferred embodiment. Obviously modifications will occur to others upon reading and understanding the specification taken together with the drawing. This embodiment is but one example, and various alternatives, modifications, variations or improvements may be made by those skilled in the art from this teaching which are intended to be encompassed by the following claims.

I claim:

1. In a digital image processing system providing circuits for processing a digital image in accordance with one of a plurality of image types in accordance with an image type detection signal received at an image processing controller, a method for improving uniformity in image type detection, the steps comprising:

receiving from an image source a document image represented in a digital image signal format, having an unknown combination of the image types in the document image, and storing digital image signals representing an area of the document image in a data buffer;

with an image segmentation circuit, receiving digital image signals from the data buffer and determining image types present in an area of the document image therefrom, said image segmentation circuit producing a detection signal for each digital image signal representing the image type at a corresponding location within the image;

converting the detection signals into a plurality of binary signals, each binary signal representing detection or non detection of a single image type;

for binary detection signals of a single image type, providing a first filter processing said binary detection signals to provide a first state thereof whenever all the binary detection signals in a predetermined set thereof have a first state, and producing a first filtered binary detection signal indicative thereof;

for each binary detection signal of a single image type, providing a second filter, processing said first filtered binary detection signal to provide a first state thereof whenever any of the first filtered binary detection signals in a predetermined set thereof have a first state and producing a second filtered binary detection signal;

directing said second binary filtered detection signals to the image processing controller to control the circuits for processing plural image types in accordance with the determined image type.

2. The method as described in claim 1, where the image types include low frequency halftones, high frequency halftones, lines and text, and continuous tones.

3. The method as described in claim 1, where each detection signal represents an image type including one of low frequency halftones, high frequency halftones, lines and text, and continuous tones.

4. The method as described in claim 3, wherein the step of converting each detection signal into a plurality of binary signals, converts each detection signal into four binary signals, each representing detection or non detection of a single image type.

5. The method of claim 1, wherein the first and second filters are operative on a structuring element including a predetermined neighborhood of pixels.

6. The method of claim 5, wherein the structuring element differs between at least two image types.

7. The method as described in claim 1, wherein the predetermined set of binary detection signals includes a binary detection signal to be processed and a plurality of binary detection signals, together corresponding to a first predetermined area of the document image.

8. The method as described in claim 1, wherein the predetermined set of first filtered binary detection signals includes a first filtered binary detection signal to be processed and a plurality of first filtered binary detection signals, together corresponding to a second predetermined area of the document image.

9. The method as described in claim 1, wherein the image processing controller is responsive to a digital detection signal representing a combination of image type detection signals, and including the further step of:

combining the second binary filtered detection signal for each image type into a processed image type detection signal.

10. The method as described in claim 9, and including the step of:

comparing each processed image type detection signal with a set of valid signal quantities to determine if the signal is valid, and repeating the last valid signal if the signal is determined invalid.

11. A digital image processing system for controlling the processing of digital images in accordance with detected image types, comprising:

a buffer memory for receiving and storing at least a portion of the document image represented in a digital image signal format, having an unknown combination of the image types in the document image from an image source;

a plurality of image processing circuits, each processing the digital image for a particular image type;

an image processing controller producing a control signal controlling the output of said plurality of image processing circuits in accordance with the detected image type;

an image segmentation circuit, receiving digital image signals from the data buffer, and detecting image types present in an area of the document image, and producing a detection signal for each digital image signal representing a detected image type at a corresponding location within the image;

means for converting the detection signals into a plurality of binary signals representing detection or non detection of a single image type;

a first filter, receiving binary detection signals from said converting means and processing the binary detection signals to provide a first state thereof whenever all the binary detection signals in a predetermined set thereof have a first state, and producing a first filtered binary detection signal indicative thereof.

12. The device as described in claim 11, where the image types include low frequency halftones, high frequency halftones, lines and text, and continuous tones.

13. The device as described in claim 11, where each detection signal represents an image type including one of low frequency halftones, high frequency halftones, lines and text, and continuous tones.

14. The device as described in claim 13, wherein the means for converting each detection signal into a plurality of binary signals, converts each detection signal into four binary signals, each representing detection or non detection of a single image type.

15. The device as described in claim 11, wherein the first and second filters are operative on a structuring element including a predetermined neighborhood of pixels.

16. The device as described in claim 15, wherein the structuring element differs between at least two image types.

17. The device as described in claim 11, wherein the predetermined set of binary detection signals includes a binary detection signal to be processed and a plurality of binary detection signals, together corresponding to a first predetermined area of the document image.

18. The device as described in claim 11, wherein the predetermined set of first filtered binary detection signals includes a first filtered binary detection signal to be processed and a plurality of first filtered binary detection signals, together corresponding to a second predetermined area of the document image.

19. The device as described in claim 11, wherein the image processing controller is responsive to a digital detection signal representing a combination of image type detection signals, and further including:

means for combining the second binary filtered detection signal for each image type into a processed image type detection signal.

20. The device as described in claim 19, and further including:

means for comparing each processed image type detection signal with a set of valid signal quantities stored in a memory device functionally connected thereto, to determine if the signal is valid, and repeating the last valid signal if the signal is determined invalid;

a second filter, receiving said first filtered binary detection signals from said first filter and processing the first filtered binary detectio signals to provide a first state thereof whenever any of the first filtered binary detection signals in a predetermined set thereof have a first state and producing a second filtered binary detection signal;

said second filter functionally connected to the image processing controller and directing to the image processing controller the second filtered binary detection signal as an indication of the detected image type.

* * * * *